United States Patent
Komatsubara

(10) Patent No.: US 11,570,966 B2
(45) Date of Patent: Feb. 7, 2023

(54) PET CARE ARTICLE

(71) Applicant: Unicharm Corporation, Ehime (JP)

(72) Inventor: Daisuke Komatsubara, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 787 days.

(21) Appl. No.: 16/300,337

(22) PCT Filed: May 20, 2016

(86) PCT No.: PCT/JP2016/065077
§ 371 (c)(1),
(2) Date: Nov. 9, 2018

(87) PCT Pub. No.: WO2017/195381
PCT Pub. Date: Nov. 16, 2017

(65) Prior Publication Data
US 2019/0223405 A1 Jul. 25, 2019

(30) Foreign Application Priority Data

May 13, 2016 (JP) .............................. JP2016-097153

(51) Int. Cl.
*A01K 1/035* (2006.01)
*A01K 1/015* (2006.01)

(52) U.S. Cl.
CPC .......... *A01K 1/0353* (2013.01); *A01K 1/0157* (2013.01)

(58) Field of Classification Search
CPC ...... A01K 23/005; A01K 23/00; A01K 1/015; A01K 1/0353; A01K 1/0157; A01K 1/035
See application file for complete search history.

(56) References Cited

U.S. PATENT DOCUMENTS 2,081,334 A * 5/1937 Kickenbush ......... A01K 1/0157
119/526
5,630,377 A * 5/1997 Kumlin ................ A01K 1/0107
119/172

(Continued)

FOREIGN PATENT DOCUMENTS

CN 618073 * 4/1980
EP 2796036 A1 10/2014

(Continued)

OTHER PUBLICATIONS

Translation of JP2009-118791 (Year: 2009).*

(Continued)

*Primary Examiner* — Magdalena Topolski
*Assistant Examiner* — Marisa V Conlon
(74) *Attorney, Agent, or Firm* — Fredrikson & Byron, P.A.

(57) ABSTRACT

A pet care article is provided which maintains excellent sanitary conditions and is not prone to causing bedsores. This pet care article (1) is provided with an absorbent sheet (2) having liquid retention properties, and a liquid-permeable cushion material (3) arranged on the top surface of the absorbent sheet and having a thickness of greater than or equal to 5 mm. The cushion material (3) comprises a fibrous structure configured from continuous fibers made from a thermoplastic resin and having a fiber diameter of 0.01-3 mm. No ends of the continuous fibers are contained in the top of said fibrous structure, and the continuous fibers are bonded together at intersections between the continuous fibers.

6 Claims, 5 Drawing Sheets

(56) References Cited

U.S. PATENT DOCUMENTS

| | | | |
|---|---|---|---|
| 5,784,995 A | 7/1998 | Willinger | |
| 6,405,676 B1* | 6/2002 | Mochizuki | A01K 1/0155 162/111 |
| 2001/0037850 A1* | 11/2001 | Marmon | D04H 1/42 156/176 |
| 2004/0137212 A1* | 7/2004 | Ochoa | A01K 1/0157 428/319.3 |
| 2004/0255869 A1* | 12/2004 | Matsuo | A01K 1/0107 119/170 |
| 2005/0166855 A1 | 8/2005 | Kaneko et al. | |
| 2008/0236501 A1* | 10/2008 | Hargrave | A01K 1/0353 119/28.5 |
| 2009/0000557 A1* | 1/2009 | Takahashi | A01K 1/0107 119/161 |
| 2009/0199785 A1* | 8/2009 | Downs | A01M 29/16 119/719 |
| 2011/0239946 A1* | 10/2011 | Ogle | A01K 1/0353 119/28.5 |
| 2014/0261219 A1* | 9/2014 | Renforth | A01K 1/0157 119/482 |
| 2015/0027380 A1* | 1/2015 | Sasano | A01K 1/0157 119/161 |
| 2015/0201579 A1* | 7/2015 | Takagi | A01K 1/0107 119/171 |
| 2016/0338313 A1 | 11/2016 | Hasegawa et al. | |

FOREIGN PATENT DOCUMENTS

| | | | |
|---|---|---|---|
| JP | 2005198598 A | | 7/2005 |
| JP | 2006000102 A | | 1/2006 |
| JP | 2006180793 A | | 7/2006 |
| JP | 2007181725 A | | 7/2007 |
| JP | 2009118791 A | | 6/2009 |
| JP | 201229624 A | | 2/2012 |
| JP | 5421482 | * | 2/2014 |
| JP | 3191888 U | | 7/2014 |
| WO | 2014192979 A1 | | 12/2014 |

OTHER PUBLICATIONS

English Abstract and Machine Translation for Japanese Publication No. 2012-029624 A, published Feb. 16, 2012, 9 pgs.

English Abstract and Machine Translation for Japanese Publication No. 2009-118791 A, published Jun. 4, 2009, 11 pgs.

English Abstract and Machine Translation for Japanese Publication No. 2007-181725 A, published Jul. 19, 2007, 14 pgs.

English Abstract and Machine Translation for Japanese Publication No. 2006-000102 A, published Jan. 5, 2006, 8 pgs.

English Abstract and Machine Translation for Japanese Publication No. 2006-180793 A, published Jul. 13, 2006, 10 pgs.

European Patent Application No. 16901726.6, Extended European Search Report dated Apr. 4, 2019, 8 pgs.

English Abstract for Japanese Publication No. 2006-180793 A, published Jul. 13, 2006, 1 pg.

English Abstract for Japanese Publication No. 2009-118791 A, published Jun. 4, 2009, 1 pg.

English Abstract for Japanese Publication No. 2006-000102 A, published Jan. 5, 2006, 1 pg.

English Machine Translation for Japanese Publication No. 3191888 U, published Jul. 17, 2014, 14 pgs.

English Abstract for Japanese Publication No. 2005-198598 A, published Jul. 28, 2005, 2 pgs.

English Abstract for Japanese Publication No. 2007-181725 A, published Jul. 19, 2007, 1 pg.

PCT International Search Report dated Jul. 12, 2016 for Intl. App. No. PCT/JP2016/065077, from which the instant application is based, 2 pgs.

* cited by examiner

PET CARE ARTICLE

RELATED APPLICATIONS

This application is a 35 U.S.C. 371 national stage filing from international application No. PCT/JP2016/065077, filed May 20, 2016, which claims priority to Japanese Application No. 2016-097153, filed May 13, 2016, the teachings of which are incorporated herein by reference.

FIELD

The present invention relates to a pet nursing product to be used during nursing of a pet such as a dog or cat.

BACKGROUND

With increasing ages of pets such as dogs and cats in recent years, the number of people nursing their pets has increased. Various nursing products are used for pet nursing, as suited for the situation, and for nursing of bedridden pets that are unable to stand on their own, for example, it is common to use an absorbing sheet for pets such as disclosed in PTL 1 as a bed mat.

CITATION LIST

Patent Literature

[PTL 1] Japanese Unexamined Patent Publication No. 2005-198598

SUMMARY

Technical Problem

However, when such an absorbing sheet for pets is spread under the body of a bedridden pet, liquid excreta such as urine that have been discharged by the bedridden pet pass over the surface of the pet's body or the surface of the absorbing sheet for pets and adheres to the hair of the pet, or liquid excreta that have been absorbed into the absorbing sheet for pets cause rewetting by body pressure of the pet and adhere onto the pet's body, or produce a moist state on the surface of the pet's body due to the liquid excreta, thus creating a poor hygienic condition.

Moreover, when the surface of the body of a bedridden pet is in a moist state, this has tended to result in soaking of the skin and physical irritation, making bedsores (decubitus sores) more likely to form.

It is therefore an object of the present invention to provide a pet nursing product that maintains a satisfactory hygienic condition and is unlikely to produce bedsores.

Solution to Problem

One aspect (aspect 1) of the invention is a pet nursing product comprising an absorbent sheet with a liquid-retaining property, and a liquid-permeable cushion material disposed on the top surface of the absorbent sheet and having a thickness of 5 mm or greater, wherein the cushion material is made of a fiber structure composed of thermoplastic resin continuous fibers having fiber diameters of 0.01 mm to 3 mm, the fiber structure does not include the ends of the continuous fibers on the top surface of the fiber structure, and the continuous fibers are joined together at the intersections between the continuous fibers.

Since the pet nursing product of aspect 1 has a liquid-permeable cushion material disposed on the top surface of an absorbent sheet having a liquid-retaining property, even when a bedridden pet discharges liquid excreta such as urine on the cushion material, the liquid excreta permeate through the cushion material and can be absorbed and retained in the absorbent sheet below it. Furthermore, since the cushion material is made of a fiber structure having a specific structure, even when the pet has lain on the top surface of the cushion material and applied body pressure in the thickness direction of the cushion material, the body pressure is diffused in the in-plane direction of the cushion material, helping to minimize reduction in the thickness of the cushion material. This allows a fixed space to be ensured between the pet's body and the absorbent sheet, thereby helping to prevent the liquid excreta held in the absorbent sheet from contacting with the pet's body or the surface of the pet's body from becoming musty.

Furthermore, since the fiber structure forming the cushion material does not include the ends of the continuous fibers on the top surface of the fiber structure, it is possible to prevent the ends from causing physical irritation on the surface (i.e. the skin) of the pet's body.

Thus, with the pet nursing product of this aspect, the surface of the body of a bedridden pet is less likely to be in a moist state by liquid excreta such as urine and less likely to be subjected to physical irritation, and therefore a satisfactory hygienic condition can be maintained and bedsores (decubitus sores) are unlikely to form.

According to another aspect (aspect 2) of the invention, in the pet nursing product of aspect 1, the fiber structure has a density of 0.01 g/cm$^3$ to 0.10 g/cm$^3$ and a thickness of 3 mm or greater when pressed by a pressure of 3.4 kPa.

In the pet nursing product of aspect 2, the liquid-permeable cushion material disposed on the top surface of the absorbent sheet is made of a fiber structure also having the physical properties specified above, the cushion material functioning as a spacer (space-holding member) between the pet's body and the absorbent sheet, thereby helping to more reliably prevent liquid excreta held in the absorbent sheet from contacting with the pet's body, or the surface of the pet's body from becoming musty. As a result, with the pet nursing product of this aspect, the surface of the body of a bedridden pet is even less likely to be in a moist state, and therefore a satisfactory hygienic condition can be more reliably maintained and bedsores (decubitus sores) are unlikely to form.

This function and effect can be adequately exhibited because even if the cushion material collapses to some degree by body pressure of the pet (i.e., about 3.4 kPa), since the cushion material has the aforementioned specific structure (i.e., the structure according to aspect 1) and physical properties (i.e., the physical properties according to aspect 2), a minimum fixed distance can be ensured between the pet's body and the absorbent sheet, and a minimum fixed quantity of liquid fluid channels can be ensured.

According to another aspect (aspect 3) of the invention, in the pet nursing product of aspect 1 or 2, the absorbent sheet comprises a top sheet made of a nonwoven fabric, a back sheet, and an absorbent body situated between the two sheets, and the nonwoven fabric has a lower density than the fiber structure.

With the pet nursing product of aspect 3, since the density of the nonwoven fabric used in the top sheet of the absorbent sheet is a lower density than the fiber structure, it is possible to form a density gradient in the thickness direction of the pet nursing product, from the cushion material (fiber structure) to the top sheet of the absorbent sheet. If such a density gradient is formed, then even when a bedridden pet has discharged liquid excreta such as urine onto the top surface of the cushion material, the discharged liquid excreta easily migrate from the cushion material (fiber structure) to the top sheet of the absorbent sheet by capillary action, while also being less likely to rewet the top surface of the cushion material, and therefore the surface of the body of the bedridden pet is even less likely to become moist. Thus, the pet nursing product of this aspect can more reliably maintain a satisfactory hygienic condition and bedsores will be even less likely to form.

According to yet another aspect (aspect 4) of the invention, in the pet nursing product of aspect 3, the fiber diameters of the thermoplastic resin fibers are larger than the fiber diameters of the fibers composing the nonwoven fabric.

In the pet nursing product of aspect 4, since the fiber diameters of the thermoplastic resin fibers composing the fiber structure are larger than the fiber diameters of the fibers composing the nonwoven fabric of the top sheet of the absorbent sheet, even when the cushion material and absorbent sheet are compressed in the thickness direction by body pressure of the pet exerted on the top surface of the cushion material (fiber structure), the cushion material (fiber structure) is unlikely to vary in density (i.e., it is unlikely to increase in density), and the density gradient of the pet nursing product of aspect 3 is easy to maintain. Thus, with the pet nursing product of this aspect, rewetting of liquid excreta is even less likely to occur, and therefore it is possible to even more reliably prevent the surface of the body of the bedridden pet from becoming moist, and bedsores can be even more reliably minimized.

According to yet another aspect (aspect 5) of the invention, in the pet nursing product of any of aspects 1 to 4, the fiber structure has, in the thickness direction, a high-density layer that forms the top surface of the fiber structure and has relatively high density, and a low-density layer that is located on the bottom surface side of the high-density layer and has relatively low density.

In the pet nursing product of aspect 5, since the fiber structure forming the cushion material has, in the thickness direction, a high-density layer with relatively high density (apparent density) and a low-density layer with relatively low density, a fixed space can be ensured between the pet's body and the absorbent sheet by the high-density layer while a fixed cushioning property can be ensured by the low-density layer, that are in the cushion material.

Furthermore, since the high-density layer forming the top surface of the cushion material (fiber structure) has densely disposed constituent fibers that are unlikely to move, the interfiber distances between the constituent fibers on the top surface are unlikely to vary even if the pet moves on the top surface of the cushion material, and liquid excreta that have been supplied onto the top surface of the cushion material can be caused to stably migrate to the bottom side of the cushion material. This can more reliably prevent the surface of the body of the bedridden pet from becoming moist.

According to yet another aspect (aspect 6) of the invention, in the pet nursing product of any of aspects 1 to 5, the fiber structure has a water retention of no greater than 7%.

In the pet nursing product of aspect 6, since the water retention of the fiber structure forming the cushion material is no greater than 7%, moisture such as liquid excreta and sweat are unlikely to pool inside the cushion material, and it is possible to more reliably prevent the surface of the body of a bedridden pet from becoming moist.

Furthermore, since a cushion material (fiber structure) having such water retention exhibits a high drying property and excellent cleanability, the hygienic condition can be even more satisfactorily maintained by cleaning the cushion material.

According to yet another aspect (aspect 7) of the invention, in the pet nursing product of any of aspects 1 to 6, the pet nursing product further includes a pet bed comprising a frame body with a prescribed thickness, and a mat that has a smaller thickness than the thickness of the frame body and is inserted in a freely detachable manner in the frame body, the absorbent sheet being disposed on the top surface of the mat.

Since the pet nursing product of aspect 7 further includes a specific pet bed that comprises a frame body with a prescribed thickness and a mat that has a smaller thickness than the thickness of the frame body and is inserted in a freely detachable manner in the frame body, even when the pet rolls over, the pet's body tends to be located in the area on the inner side of the frame body (i.e., on the top surface of the mat), and the effects of the absorbent sheet and cushion material can be more reliably and stably exhibited.

Furthermore, when the pet lies on the pet bed, the pet can more easily roll over, thus helping to prevent the pet from having the same posture for long periods and making bedsores less likely to form.

Yet another aspect (aspect 8) of the invention is a method of using a liquid-permeable cushion material having a thickness of 5 mm or greater, the cushion material being made of a fiber structure that is composed of thermoplastic resin fibers having fiber diameters of 0.01 mm to 3 mm, does not include the ends of the continuous fibers on the top surface of the fiber structure, and has the continuous fibers joined together at the intersections between the continuous fibers, wherein the method includes disposing the cushion material on the top surface of an absorbent sheet having a liquid-retaining property, and then placing a pet on the top surface of the cushion material and nursing the pet.

In the method of using a cushion material according to aspect 8, a liquid-permeable cushion material is disposed on the top surface of an absorbent sheet having a liquid-retaining property, and therefore even when a bedridden pet has discharged liquid excreta such as urine on the cushion material, the liquid excreta permeate through the cushion material and can be absorbed and retained in the absorbent sheet below it. Furthermore, since the cushion material is made of a fiber structure having a specific structure, even when the pet has lain down on the top surface of the cushion material and applied body pressure in the thickness direction of the cushion material, the body pressure is diffused in the in-plane direction of the cushion material, helping to minimize reduction in the thickness of the cushion material. This allows a fixed space to be ensured between the pet's body and the absorbent sheet, thereby helping to prevent the liquid excreta held in the absorbent sheet from contacting with the pet's body or the surface of the pet's body from becoming musty.

Furthermore, since the fiber structure forming the cushion material does not include the ends of the continuous fibers on the top surface of the fiber structure, it is possible to prevent the ends from causing physical irritation on the surface (i.e. the skin) of the pet's body.

Thus, with the method of using a cushion material according to this aspect, the surface of the body of a bedridden pet is less likely to be in a moist state by liquid excreta such as urine and less likely to be subjected to physical irritation, and therefore a satisfactory hygienic condition can be maintained and bedsores (decubitus sores) are unlikely to form. As a result, the effort required by the caregiver to deal with bedsores on pets (for example, periodical turning over) can be reduced.

Advantageous Effects of Invention

According to the invention it is possible to provide a pet nursing product that maintains a satisfactory hygienic condition and is unlikely to produce bedsores.

DESCRIPTION OF EMBODIMENTS

Figure 1:
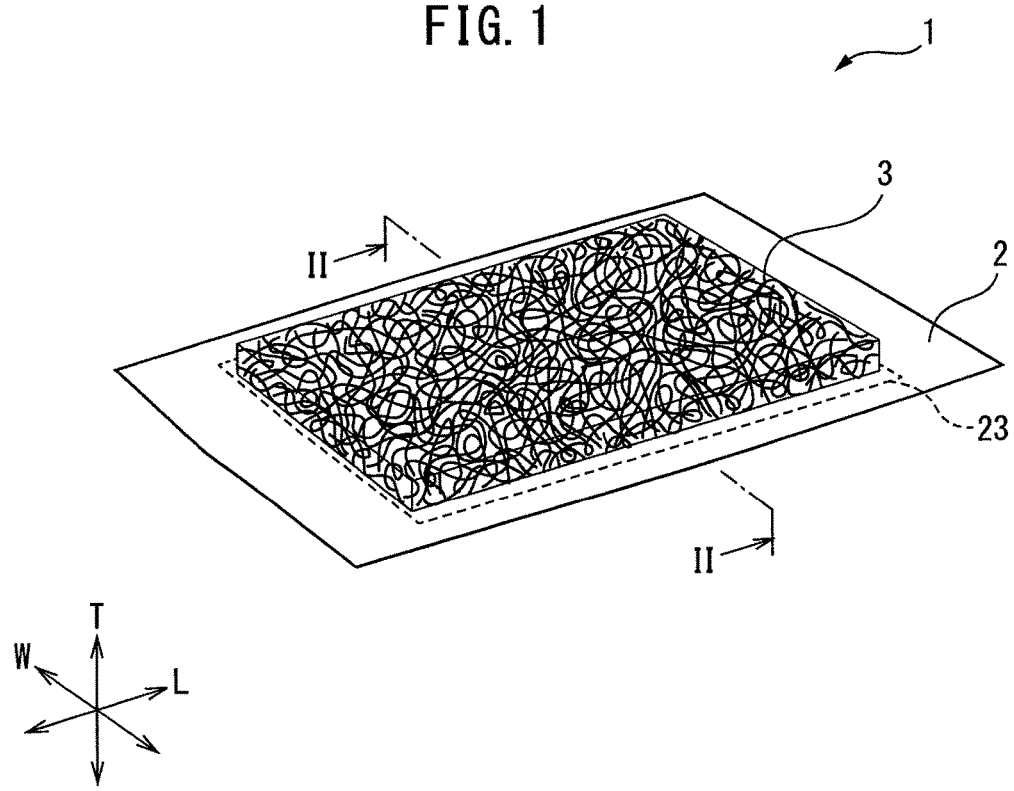
FIG. 1 is a perspective view of a pet nursing product according to a first embodiment of the invention.

Preferred embodiments of the pet nursing product of the invention will now be described in detail with reference to the accompanying drawings. Throughout the present description, unless otherwise specified, the concept of "viewing an object (for example, a pet nursing product, absorbent sheet, cushion material or pet bed) on the horizontal plane in the same form as when it is used, in the thickness direction of the object from the top side in the vertical direction" will be referred to as "the planar view", and especially when the object is a sheet-like member such as an absorbent sheet, the concept of "viewing an object on the horizontal plane in the expanded state in the thickness direction of the object from the top side in the vertical direction" will be referred to as "the planar view". A "plan view" refers to a drawing as seen in the planar view.

The directions used in the present description are as follows, unless otherwise specified.

Throughout the present description, "lengthwise direction" refers to the "long direction of the lengths of a longitudinal object in the planar view", "widthwise direction" refers to the "short direction of the lengths of a longitudinal object in the planar view", and "thickness direction" refers to the "vertical direction of an object situated on the horizontal plane", with the lengthwise direction, widthwise direction and thickness direction being in a mutually perpendicular relationship.

Also throughout the present description, the "relatively proximal side with respect to the center of an object (for example, a pet nursing product, absorbent sheet, cushion material or pet bed) (for example, the intersection between the widthwise center axis line running in the lengthwise direction and the lengthwise center axis line running in the widthwise direction)" will be referred to as the "inner side", and likewise the "relatively distal side with respect to the center of an object (for example, a pet nursing product, absorbent sheet, cushion material or pet bed) (for example, the intersection between the widthwise center axis line running in the lengthwise direction and the lengthwise center axis line running in the widthwise direction)" will be referred to as the "outer side". Incidentally, unless otherwise specified, the term "height" used throughout the present description means the distance from the horizontal plane as the reference plane, for an object (for example, a pet nursing product or pet bed) situated on the horizontal plane, to the apex of the object in the vertical direction.

Moreover, unless otherwise specified, for the thickness direction of a pet nursing product (including a pet bed), the "relatively distal side with respect to the mounting side, when the pet nursing product is set on the mounting side in the same form as when it is used" will be referred to herein as the "top side", and the "relatively proximal side with respect to the mounting side when the pet nursing product is set on the mounting side in the same form as when it is used" will be referred to as the "bottom side". Incidentally, for the pet nursing product and for each of the members composing the pet nursing product, the surface on the top side will be referred to as "top surface", and the surface on the bottom side as "bottom surface".

Figure 2:
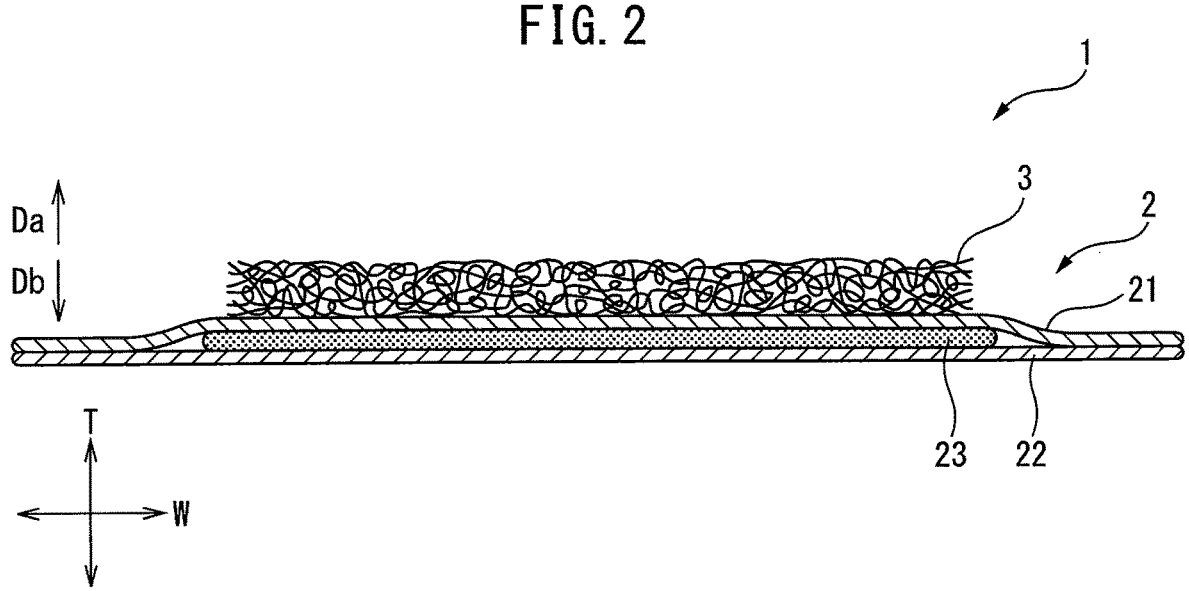
FIG. 2 is a cross-sectional view of the pet nursing product according to the first embodiment of the invention, along line II-II of FIG. 1.

FIG. 1 is a perspective view of a pet nursing product 1 according to the first embodiment of the invention, and FIG. 2 is a cross-sectional view of the pet nursing product 1 along line in FIG. 1.

As shown in FIG. 1 and FIG. 2, the pet nursing product 1 according to the first embodiment of the invention is constructed of an approximately rectangular solid laminate having a lengthwise direction L, a widthwise direction W and a thickness direction T, the laminate comprising an absorbent sheet 2 with a liquid-retaining property, having an essentially rectangular shape in the planar view, and a cushion material 3 made of an essentially rectangular solid fiber structure with a cushioning property, situated on the surface of the top side Da (top surface) of the absorbent sheet 2.

The pet nursing product of the first embodiment has an essentially rectangular shape in the planar view conforming to the absorbent sheet 2; however, according to the invention the shape of the pet nursing product in the planar view is not limited to the shape of the first embodiment, and any desired shape (such as circular, elliptical, square, triangular or star-shaped) may be employed, depending on the size of the pet and the desired design property. The outer dimensions of the pet nursing product may be appropriately selected depending on the size and type of pet that will use the bed, and if the pet is a small or medium-sized dog, for example, the length in the lengthwise direction L (i.e., the length in the lengthwise direction of the absorbent sheet) will be about 300 mm to 600 mm and the length in the widthwise direction W (i.e., the length in the widthwise direction of the absorbent sheet) will be about 200 mm to 500 mm.

Since the pet nursing product 1 according to the first embodiment has the liquid-permeable cushion material 3 disposed on the top surface of the absorbent sheet 2 that has a liquid-retaining property, even when a bedridden pet discharges liquid excreta such as urine onto the cushion material 3, the liquid excreta permeate through the cushion material 3 and can be absorbed and retained in the absorbent sheet 2 below it. Furthermore, since the cushion material 3 is made of a fiber structure having the aforementioned specific structure, even when the pet has lain on the top surface of the cushion material 3 and applied body pressure in the thickness direction T of the cushion material 3, the body pressure is diffused in the in-plane direction of the cushion material 3 (i.e., the in-plane direction parallel to the top surface), thus helping to minimize reduction in the thickness of the cushion material 3. This allows a fixed space to be ensured between the pet's body and the absorbent sheet 2, thereby helping to prevent the liquid excreta held in the absorbent sheet 2 from contacting with the pet's body or the surface of the pet's body from becoming musty.

Furthermore, since the fiber structure forming the cushion material 3 does not include the ends of the continuous fibers on the top surface of the fiber structure, it is possible to prevent the ends from causing physical irritation on the surface (i.e. the skin) of the pet's body.

Thus, with the pet nursing product 1 of the first embodiment, the surface of the body of a bedridden pet is less likely to be in a moist state by liquid excreta such as urine and less likely to be subjected to physical irritation, and therefore a satisfactory hygienic condition can be maintained and bedsores (decubitus sores) are unlikely to form.

Incidentally, according to the invention, the fiber structure forming the cushion material may have ends of the continuous fibers on the side surfaces extending in the thickness direction of the fiber structure, as explained below, and therefore the border sections of each of the sides, which may be considered as the top surface or side surfaces of the fiber structure, may include ends of the continuous fibers. Therefore, for the purpose of the present description, the condition that the fiber structure does not include ends of the continuous fibers on the top surface of the fiber structure means that the ends of the continuous fibers are essentially not present on the top surface of the fiber structure, whereas ends of the continuous fibers may be included at the aforementioned border sections (i.e., at the border sections between the top surface and the side surfaces of the fiber structure).

The pet nursing product of the invention is placed at a prescribed location of a pet's living space (for example, indoors), with the cushion material positioned further toward the top side than the absorbent sheet, as shown in FIG. 1, and the top surface of the cushion material is used as a pet bed. Incidentally, the pet nursing product of the invention may be placed directly on the floor surface or ground of the pet's living space, or it may be set via a pet bed such as the second embodiment described below, or a prescribed holder, mat or the like.

The pet that is to use the pet nursing product of the invention is not particularly restricted so long as it is an animal that can be kept as a pet, and it may be used for various animals such as dogs, cats or rabbits.

Each of the members of the pet nursing product of the invention will now be explained in detail using the pet nursing product 1 according to the first embodiment described above.

[Absorbent Sheet]

For the pet nursing product 1 of this embodiment, as shown in FIG. 1 and FIG. 2, the absorbent sheet 2 is constructed of a sheet-like member with a liquid-retaining property, having an essentially rectangular outer shape in the planar view in the expanded state, and it comprises at least a top sheet 21, a back sheet 22 and an absorbent body 23 located between the two sheets. The absorbent sheet 2 with a liquid-retaining property is disposed on the bottom side Db of the liquid-permeable cushion material 3 serving as the bed for the bedridden pet, and it can absorb and retain liquid excreta such as urine that have been discharged onto the cushion material 3 and permeated the cushion material 3.

According to the invention, the sheet-like member with a liquid-retaining property composing the absorbent sheet is not particularly restricted, and any sheet-like member with a liquid-retaining property may be employed; however, a sheet-like member comprising at least a top sheet made of a nonwoven fabric, a back sheet and an absorbent body situated between the two sheets may be suitably used, as in the first embodiment described above. Such sheet-like members include, but are not particularly limited to, absorbent sheets for pet excreta treatment as disclosed in Japanese Unexamined Patent Publication No. 2005-198598, for example.

Moreover, when the absorbent sheet is a sheet-like member with a liquid-retaining property comprising a top sheet made of a nonwoven fabric, a back sheet and an absorbent body situated between the two sheets, the nonwoven fabric composing the top sheet preferably has a lower density than the fiber structure described below which forms the cushion material.

Since the density of the nonwoven fabric used in the top sheet of the absorbent sheet is lower than the density of the fiber structure forming the cushion material, it is possible to form a density gradient in the thickness direction of the pet nursing product, from the cushion material (fiber structure) to the top sheet of the absorbent sheet. If such a density gradient is formed, then even when a bedridden pet has discharged liquid excreta such as urine onto the top surface of the cushion material, the discharged liquid excreta easily migrate from the cushion material (fiber structure) to the top sheet of the absorbent sheet by capillary action, while also being less likely to rewet the top surface of the cushion material, and therefore the surface of the body of the bedridden pet is even less likely to become moist. Thus, the pet nursing product can more reliably maintain a satisfactory hygienic condition and bedsores will be even less likely to form.

Incidentally, the density of the nonwoven fabric can be calculated by dividing the basis weight of the nonwoven fabric by the thickness. The thickness of the nonwoven fabric may be measured in the following manner.

First, a sample sheet of a prescribed size (for example, 100 mm×100 mm) is cut out from the nonwoven fabric to be measured. The cut out sample sheet is set in an automated compression tester "KES FB-3A" by Kato Tech Corp., the thickness (mm) is measured with a pressure of 49 Pa on the sample sheet by the measuring terminal of the tester, and the measured thickness (mm) is recorded as the thickness of the sample sheet.

The density (apparent density) of the fiber structure forming the cushion material may be measured in the following manner. First, a sample with a size of 15 cm×15 cm is cut out from the fiber structure to be measured without altering the thickness, and the sample mass (g) is measured. Next, the thickness (cm) of the cut out sample is measured in the same manner as for measurement of the thickness of the mat, and the sample volume ($cm^3$) is calculated. By dividing the final sample mass by the volume, it is possible to obtain a value for the density (apparent density) ($g/cm^3$).

According to the invention, incidentally, the planar shape and outer dimensions of the absorbent sheet with a liquid-retaining property are not particularly restricted so long as the effect of the invention is not inhibited, and any planar shape and outer dimension may be employed; however, in the absorbent sheet of the invention, the absorbent body in the absorbent sheet has a larger planar area than the planar area of the top surface of the cushion material. If the absorbent body in the absorbent sheet has a larger planar area than the planar area of the top surface of the cushion material, then liquid excreta such as urine that have permeated the cushion material 3 can be more reliably absorbed and retained in the absorbent sheet.

Throughout the present description, "planar area" means the area of the outer shape of an object (for example, an absorbent sheet, mat or cushion material) in the planar view. For this embodiment, therefore, the planar area of the absorbent sheet 2 in the expanded state is the rectangular area of the outer shape of the top surface of the absorbent sheet 2.

[Cushion Material]

In the pet nursing product 1 of the first embodiment, as shown in FIG. 1 and FIG. 2, the liquid-permeable cushion material 3 is constructed of an approximately rectangular solid fiber structure having a smaller planar area than the absorbent sheet 2. The cushion material 3 is disposed on the top surface of the absorbent sheet 2 and forms the bed of the pet nursing product 1, allowing the pet's body to be supported while diffusing the body pressure of the pet that is lying on the bed. Therefore, the fiber structure forming the cushion material 3 has liquid permeability and physical properties allowing it to function as a bed for a pet (for example, a (high-resilient) cushioning property, softness, strength and air permeability). The planar area of the cushion material will usually be in the range of 70% to 100% of the planar area of the absorbent sheet.

The fiber structure forming the cushion material 3 is a fiber structure having a thickness of 5 mm or greater and composed of thermoplastic resin continuous fibers with fiber diameters of 0.01 mm to 3 mm, the fiber structure having a specific structure which does not include the ends of the continuous fibers on the top surface of the fiber structure, and wherein the continuous fibers are joined together at the intersections between the continuous fibers.

If fiber structure forming the cushion material 3 comprises this specific structure, then even when the pet has lain on the top surface of the cushion material 3 and applied body pressure in the thickness direction T of the cushion material 3, the body pressure is diffused in the in-plane direction of the cushion material 3, helping to minimize reduction in the thickness of the cushion material 3. This allows a fixed space to be ensured between the pet's body and the absorbent sheet 2, thereby helping to prevent the liquid excreta held in the absorbent sheet 2 from contacting with the pet's body or the surface of the pet's body from becoming musty. Furthermore, since such a fiber structure does not include the ends of the continuous fibers on the top surface of the fiber structure, it is possible to prevent the ends from causing physical irritation on the surface (i.e. the skin) of the pet's body.

Moreover, in addition to the specific structure described above, the fiber structure forming the cushion material according to the invention preferably has a density of 0.01 g/cm$^3$ to 0.10 g/cm$^3$, and has the specific physical property of a thickness of 3 mm or greater when pressed by a pressure of 3.4 kPa.

If the fiber structure additionally has this specific physical property, then the cushion material will function as a spacer (space-holding member) between the pet's body and the absorbent sheet, thereby helping to more reliably prevent liquid excreta held in the absorbent sheet from contacting with the pet's body, or the surface of the pet's body from becoming musty. This will make the surface of the body of a bedridden pet even less likely to be in a moist state, and therefore a satisfactory hygienic condition can be more reliably maintained and bedsores are unlikely to form. This function and effect can be adequately exhibited because even if the cushion material collapses to some degree by body pressure of the pet (i.e., about 3.4 kPa), since the cushion material has the aforementioned specific structure and physical properties, a minimum fixed distance can be ensured between the pet's body and the absorbent sheet, and a minimum fixed quantity of liquid fluid channels can be ensured.

Measurement of the fiber diameters of the fibers composing the fiber structure may be carried out in the following manner. First, fibers of prescribed lengths (for example, 5 mm) are cut out from 10 arbitrary locations of the fiber structure to be measured, and the ends of the cut out fibers are cut perpendicular to the direction in which the fibers extend. The cut surface is photographed at a prescribed magnification, and the fiber diameters (mm) of the fibers are measured from the obtained cross-sectional photograph. Incidentally, the value for the fiber diameter is the average value of the fiber diameters of the 10 cut out fibers.

The thickness of the fiber structure when pressed at a pressure of 3.4 kPa (35 gf/cm$^2$) may be measured in the following manner. First, a pressure plate having a prescribed area (for example, a circular pressure plate with an area of 100π cm$^2$) is) pressed against the fiber structure to be measured, at a pressure of 3.4 kPa. The thickness (mm) of the fiber structure in the state pressed against the pressure plate may be measured to obtain the thickness when pressed by the specific pressure.

The fiber structure used as the liquid-permeable cushion material in the pet nursing product of the invention is not particularly restricted so long as it at least has the aforementioned structure; however, from the viewpoint of cushioning performance with excellent high resilience and also excellent performance in terms of air permeability, water permeability and durability, the fiber structure preferably is a web-like fiber structure wherein the thermoplastic resin continuous fibers form a plurality of loops while being tangled in a disordered manner and joined together by heat fusion at their intersections. Such a fiber structure has the ends of the continuous fibers (constituent fibers) on the side surfaces extending in the thickness direction of the fiber structure, while the ends of the constituent fibers are essentially absent inside of the fiber structure. The thermoplastic resin forming such continuous fibers may be a polyester-based resin, polyamide-based resin, polyether-based resin or polyolefin-based resin, for example.

Also according to the invention, the fiber structure forming the liquid-permeable cushion material has a higher density than the nonwoven fabric used in the top sheet of the absorbent sheet, and preferably the fiber diameters of the thermoplastic resin fibers composing the fiber structure are larger than the fiber diameters of the fibers composing the nonwoven fabric used in the top sheet of the absorbent sheet.

If the density of the fiber structure is higher than the density of the nonwoven fabric used in the top sheet of the absorbent sheet, it is possible to form a density gradient in the thickness direction of the pet nursing product, from the cushion material (fiber structure) to the top sheet of the absorbent sheet. If such a density gradient is formed, then even when a bedridden pet has discharged liquid excreta such as urine onto the top surface of the cushion material, the discharged liquid excreta easily migrates from the cushion material (fiber structure) to the top sheet of the absorbent sheet by capillary action, while also being less likely to rewet the top surface of the cushion material, and therefore the surface of the body of the bedridden pet is even less likely to become moist. Moreover, if the fiber diameters of the thermoplastic resin fibers composing the fiber structure are larger than the fiber diameters of the fibers composing the nonwoven fabric used in the top sheet of the absorbent sheet, then even when the cushion material and absorbent sheet are compressed in the thickness direction by body pressure of the pet exerted on the top surface of the cushion material (fiber structure), the cushion material (fiber structure) will be unlikely to vary in density (i.e., it will be unlikely to increase in density), it will be easy to maintain the density gradient in the thickness direction, rewetting by liquid excreta will be even less likely to occur, and it will be possible to more reliably prevent the surface of the body of the bedridden pet from becoming moist.

The fiber diameters of the fibers composing the nonwoven fabric can be measured by magnified observation of the fibers using a scanning electron microscope or the like.

According to the invention, for the fiber structure forming the cushion material it is also suitable to use a fiber structure with a two-layer structure having, in the thickness direction, a high-density layer that forms the top surface of the fiber structure and has a relatively high density (apparent density), and a low-density layer that is situated on the bottom side of the high-density layer and has a relatively low density.

If the fiber structure forming the cushion material has, in the thickness direction, a high-density layer with relatively high density and a low-density layer with relatively low density, a fixed space can be ensured between the pet's body and the absorbent sheet by the high-density layer while a fixed cushioning property can be ensured by the low-density layer, that are in the cushion material.

Furthermore, if a fiber structure with such a two-layer structure is used as the cushion material with the high-density layer on the top side, since the high-density layer forming the top surface of the cushion material (fiber structure) has densely disposed constituent fibers that are unlikely to move, the interfiber distances between the constituent fibers on the top surface are unlikely to vary even if the pet moves on the top surface of the cushion material, and liquid excreta that have been supplied onto the top surface of the cushion material can be caused to stably migrate to the bottom side of the cushion material. This can more reliably prevent the surface of the body of the bedridden pet from becoming moist.

Also according to the invention, the fiber structure forming the cushion material preferably has a water retention of no greater than 7%. If the water retention of the fiber structure forming the cushion material is no greater than 7%, moisture such as liquid excreta and sweat are unlikely to pool inside the cushion material, and it is possible to more reliably prevent the surface of the body of a bedridden pet from becoming moist.

Furthermore, if the fiber structure forming the cushion material is one with a high drying property and excellent cleanability, then the hygienic condition at the site of nursing can be even more satisfactorily maintained by cleaning the cushion material.

The water retention of the fiber structure may be adjusted by selection of the material or the constituent fiber, adjustment of its density, or subjecting it to surface treatment such as water-repellent treatment.

The water retention (%) of the fiber structure may be measured in the following manner. First, after measuring the mass of the fiber structure to be measured, the fiber structure is immersed in a water tank. After immersion for 10 minutes, the fiber structure is removed from the water tank and maximally drained, and then allowed to stand for 24 hours in an atmosphere at 30° C., RH 65%. The mass of the fiber structure after standing for 24 hours is measured, and the residual water content is calculated as a percentage and recorded as the water retention (%) of the fiber structure.

According to the invention, the shape and outer dimensions of the liquid-permeable cushion material are not particularly restricted so long as the effect of the invention is not inhibited, and any shape and outer dimensions may be employed.

For example, the shape of the cushion material may be any one such as a disc shape, and the thickness of the cushion material may be any thickness in the range of 5 mm to 200 mm.

The method of producing the fiber structure that is to form the liquid-permeable cushion material is not particularly restricted, and the fiber structure may be produced by any publicly known production method. The fiber structure can be produced by discharging a molten thermoplastic resin as filaments from a perforated discharge nozzle having a plurality of orifices, and contacting the discharged filaments together while in a molten state, to form a plurality of filamentous loops and obtain a net-like fiber structure in which they are fused together in a disorderly tangled state, after which the net-like fiber structure is cooled while clamping both sides with a pair of endless net conveyors.

The physical properties of the fiber structure, including the thickness, density, compression property and fiber diameters of the constituent fiber, can be easily adjusted by appropriately setting the production conditions including the discharge hole diameters and throughput (pressure) of the perforated discharge nozzle, the distance between the conveyors of the pair of endless net conveyor, the transport speed and the cooling temperature.

Incidentally, the fiber structure to be used in the mat described below can be produced in a similar manner.

The pet nursing product 10 according to the second embodiment of the invention will now be described in detail with reference to the accompanying drawings. Explanation of the aspects of the construction (absorbent sheet, cushion material, etc.) that are the same as the first embodiment will be omitted.

Figure 3:
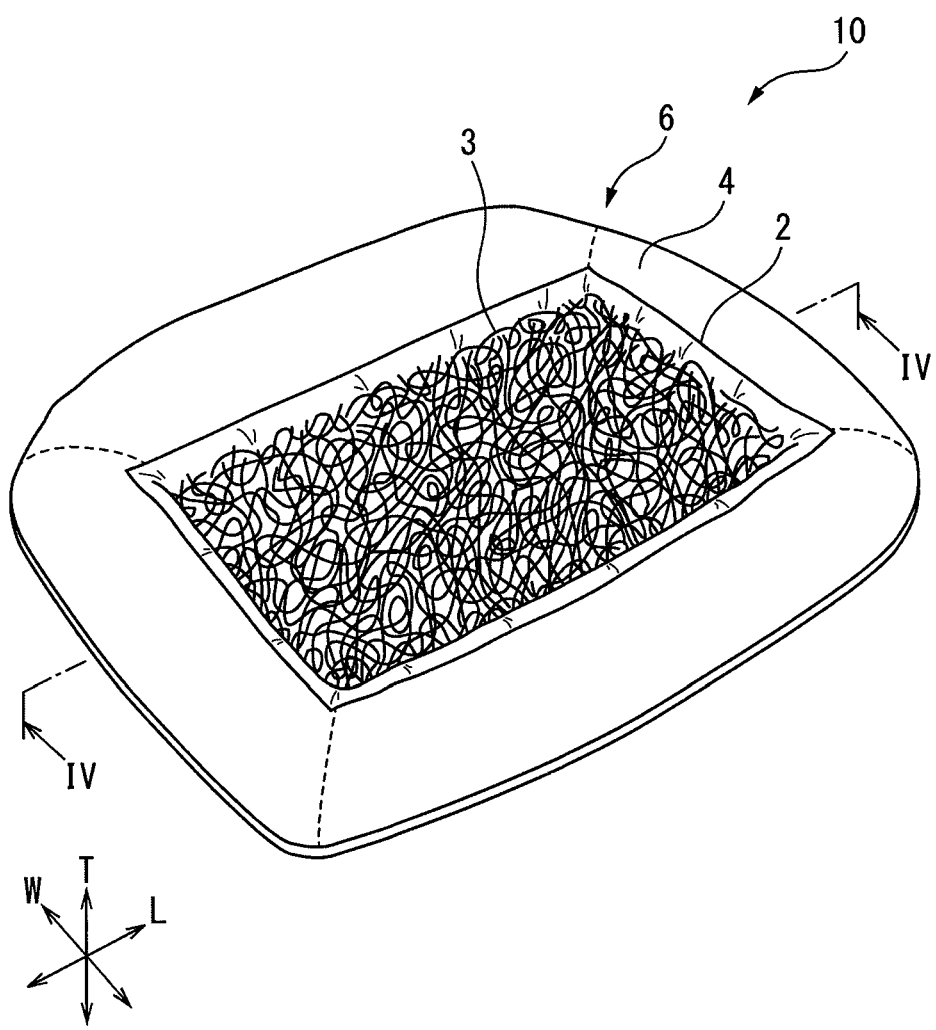
FIG. 3 is a perspective view of a pet nursing product according to a second embodiment of the invention.
Figure 4:
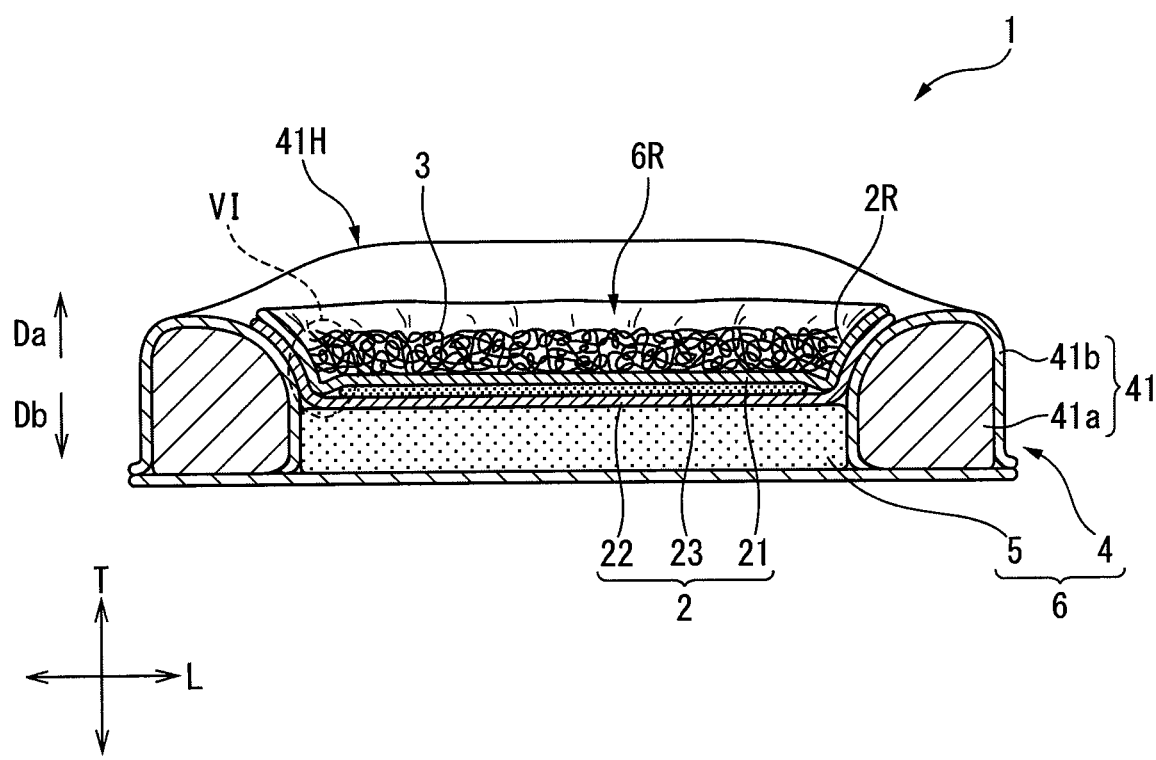
FIG. 4 is a cross-sectional view of the pet nursing product according to the second embodiment of the invention, along line IV-IV of FIG. 3.

FIG. 3 is a perspective view of the pet nursing product 10 according to the second embodiment of the invention, and FIG. 4 is a cross-sectional view of the pet nursing product 10 along line IV-IV in FIG. 3. Also, FIG. 5 is an exploded perspective view of the pet nursing product 10.

Figure 5:
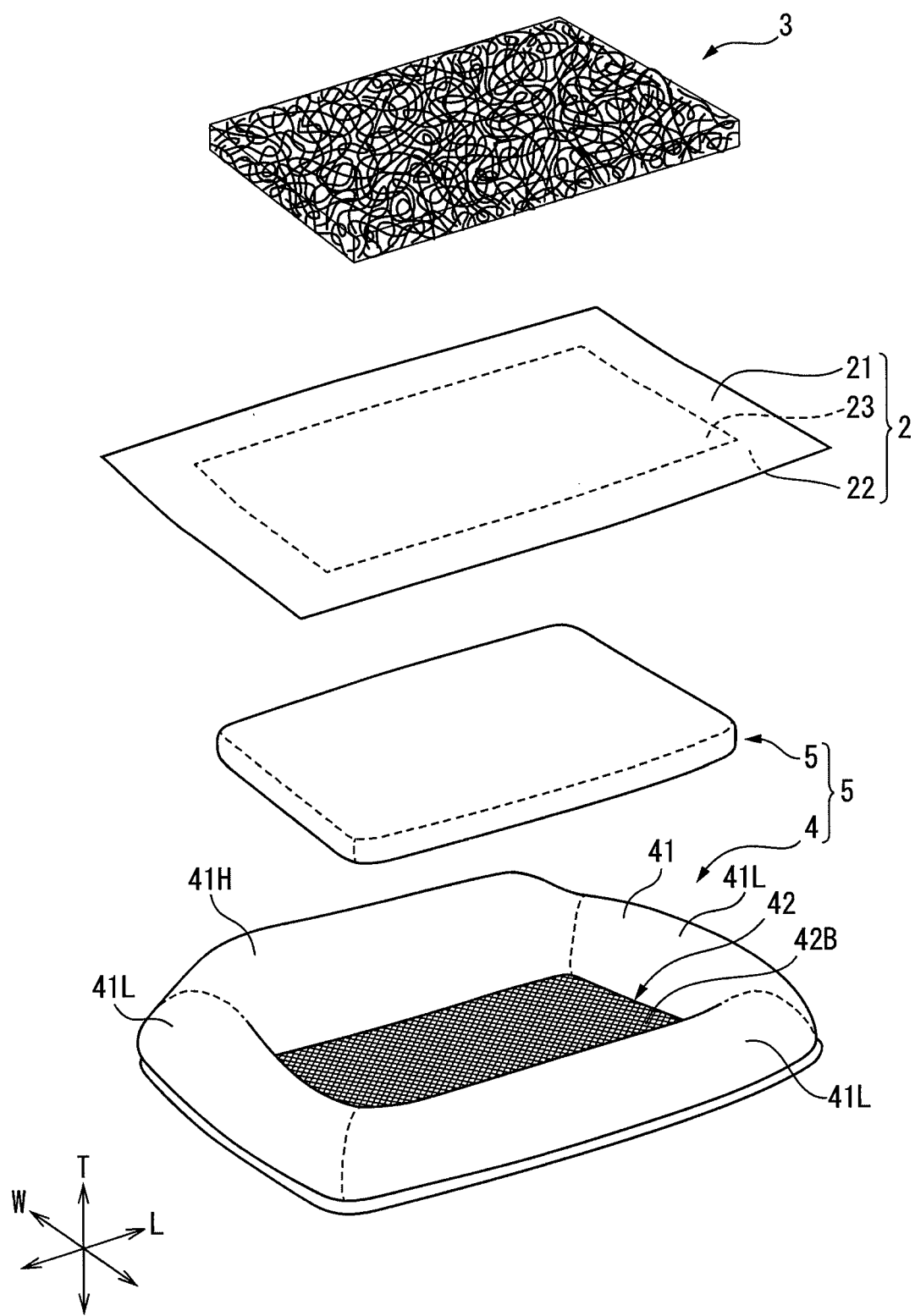
FIG. 5 is an exploded perspective view of a pet nursing product according to the second embodiment of the invention.

As shown in FIGS. 3 to 5, the pet nursing product 10 of the second embodiment of the invention is constructed with a pet bed 6 that includes a rim-like frame body 4 with an essentially rectangular shape of a prescribed thickness and an essentially rectangular solid mat 5 having a smaller thickness than the thickness of the frame body 4, an absorbent sheet 2 with an essentially rectangular shape, situated on the surface of the top side Da (top surface) of the mat 5, and a liquid-permeable cushion material 3 made of an essentially rectangular solid fiber structure, situated on the top surface of the absorbent sheet 2. The absorbent sheet 2 and cushion material 3 of the second embodiment are the same as for the first embodiment.

In the pet nursing product 10 of the second embodiment, as shown in FIG. 3, the pet bed 6 has a rounded longitudinal, essentially rectangular outer shape with a lengthwise direction L and a widthwise direction W, in the planar view. According to the invention, the planar shape of the pet bed is not limited to this one, and any desired shape (such as circular, elliptical, square, triangular or star-shaped) may be employed, depending on the size of the pet and the desired design property. The outer dimensions of the pet bed may also be appropriately selected depending on the size and type of pet that will use the bed, and if the pet is a small or medium-sized dog, the length in the lengthwise direction L (the distance between the outer surfaces of the frame of the frame body in the lengthwise direction L) is about 400 mm to 1400 mm and the length in the widthwise direction W (the distance between the outer surfaces of the frame of the frame body in the widthwise direction W) is about 250 mm to 1200 mm.

As shown in FIG. 3 and FIG. 4, the pet nursing product 10 of the second embodiment is constructed with the perimeter portion of the pet bed 6 rising to the top side Da by the frame body 4 which has a prescribed thickness (i.e., the height of the perimeter portion is higher), and the center section surrounded by the perimeter portion (frame body 4) as a recess 6R depressed toward the bottom side Db. In other words, as shown in FIG. 3 and FIG. 4, the recess 6R is constructed by a perimeter wall consisting of the inner sides (the inner peripheral wall surfaces) of the frame of the frame body 4 and a bottom part consisting of the top surface of the cushion material 3, and it is designed so that at the bottom part of the recess 6R, body pressure of the pet can be diffused while supporting the pet's body. The pet can therefore lie down in the recess 6R as a sleeping area, resting in the recess 6R.

Furthermore, in the pet nursing product 10 of the second embodiment, the design is such that the absorbent sheet 2 with a liquid-retaining property is situated on the top surface of the mat 5 of the pet bed 6 (i.e., the bottom side Db of the bottom part of the recess 6R serving as the sleeping area of the pet nursing product 10), so that even when a bedridden pet in need of nursing discharges liquid excreta such as urine into the recess 6R, the liquid excreta can be absorbed and retained on the bottom side Db of the bottom part of the recess 6R.

Since the pet nursing product 10 of the second embodiment further includes a specific pet bed 6 (pet bed) that comprises a frame body 4 with a prescribed thickness and a mat 5 that has a smaller thickness than the thickness of the frame body 4 and is inserted in a freely detachable manner in the frame body 4, even when the pet rolls over, the pet's body tends to be located in the area on the inner side of the frame body 4 (i.e., on the top surface of the mat 5), and the effects of the absorbent sheet 2 and cushion material 3 can be more reliably and stably exhibited (i.e., the effects whereby the surface of the body of the bedridden pet is unlikely to become moist by liquid excreta such as urine, so that a satisfactory hygienic condition can be maintained and bedsores are unlikely to form).

Furthermore, when the pet lies on the pet bed, the pet can more easily roll over, thus helping to prevent the pet from having the same posture for long periods and making bedsores less likely to form.

The pet nursing product 10 of the second embodiment is used with the recess of the pet bed facing upward, as shown in FIG. 3, at a prescribed location in the pet's living space (for example, indoors), allowing the pet to lie down in the recess for resting. Incidentally, the pet bed may be set directly on the floor surface or ground of the pet's living space, or it may be set via a prescribed holder, mat or the like.

Each of the constituent members of the pet nursing product 10 according to the second embodiment of the invention will now be described in detail with reference to the accompanying drawings. Parts of the absorbent sheet 2 and cushion material 3 forming part of the pet nursing product 10 of the second embodiment that are identical to the first embodiment will not be explained again.

[Pet Bed]

In the pet nursing product 10 of the second embodiment, as shown in FIG. 4 and FIG. 5, the pet bed 6 is constructed of a rim-like frame body 4 having a prescribed thickness and an essentially rectangular planar shape, and an essentially rectangular solid mat 5 having a smaller thickness than the thickness of the frame body 4, and inserted in a freely detachable manner on the inner side of the frame body 4.

As shown in FIG. 4 and FIG. 5, the perimeter portion of the pet bed 6 rises further toward the top side Da than the center section where the mat 5 is located, due to the frame body 4 which has a prescribed thickness, and a housing recess is formed for housing of the absorbent sheet 2 and cushion material 3, by the inner peripheral wall surfaces of the perimeter portion that is raised toward the top side Da (i.e., the inner side surfaces of the frame of the frame body 4) and the top surface of the mat 5 surrounded by the inner peripheral wall surfaces. Since the housing recess is formed by the mat 5 having a bottom part with a prescribed cushioning property, the construction is such that it is possible to support the pet's body which diffusing body pressure of the pet even if the pet bed does not comprise the aforementioned cushion material.

[Frame Body]

In the pet nursing product 10 of the second embodiment, as shown in FIG. 5, the frame body 4 forming part of the pet bed 6 is constructed of a frame body portion 41 having a prescribed thickness and having a rim-like structure along each of the sides of an essentially rectangular shape in the planar view, and a frame body recess 42 for housing of the mat 5, comprising a bottom part 42B located on the bottom side Db in the thickness direction T on the inner side of the frame of the frame body portion 41.

According to the second embodiment, as shown in FIGS. 3 to 5, the frame body portion 41 forming the perimeter portion of the pet bed 6 has a rim-like planar shape along each side of the essentially rectangular shape; however, as shown in FIG. 5, one of the four sides forming the frame body portion 41 is formed as a frame body high part 41H rising further toward the top side than the other three sides (i.e., it has a relatively higher height than the other three sides), and can function as a back support for the pet that is lying down in the recess 6R of the pet nursing product 10. On the other hand, as shown in FIG. 3, three of the four sides forming the frame body portion 41 are formed as frame body low parts 41L with relatively lower heights than the aforementioned frame body high part 41H, facilitating entry and exit of the pet into the recess 6R of the pet nursing product 10, while also functioning as a pillow that allows resting of the head of the pet lying down in the recess 6R.

Incidentally, according to the invention, the structure of the frame body portion is not limited to that of the embodiment described above, and the frame body portion may be formed as a frame body high part with two of the four sides having higher heights, or all of the four sides may have the same heights. Moreover, when the planar shape of the frame body portion is circular, part of the circular perimeter portion may be formed as the frame body high part with a higher height.

Moreover, for the second embodiment, as shown in FIG. 4, the frame body portion 41 is constructed of a core material 41a forming the basic backbone of the frame body portion 41, and a sheet-like covering material 41b covering the core material 41a.

The member forming the core material 41a is not particularly restricted and any member that is publicly known in the field may be employed; however, it is preferred to use one having a prescribed cushioning property and air permeability, such as cotton or urethane foam, or foam beads.

The sheet forming the covering material 41*b* is also not particularly restricted, and for example, a fabric (such as a woven fabric or knitted fabric) made of synthetic fibers or natural fibers may be used; however, the sheet preferably has a stretchable property from the viewpoint of ability to follow shape deformation of the core material 41*a*.

Also for the second embodiment, as shown in FIG. 4 and FIG. 5, the frame body recess 42 is constructed of the inner side surfaces of the frame of the frame body portion 41 (the inner peripheral wall surfaces), and the bottom part 42B located on the bottom side Db in the thickness direction T on the inner side of the frame of the frame body portion 41. The bottom part 42B is formed of a mesh fabric (for example, a woven fabric or knitted fabric composed of synthetic fibers) that is continuous from the surface of the bottom side Db (bottom surface) of the frame body portion 41, ensuring air permeability so that air is not impeded by the mat 5 inserted in the frame body recess 42. The mesh fabric is attached across the entire bottom surface of the frame body portion 41.

According to the invention, the frame body recess is not limited to this mode and may instead be formed as an opening without a bottom part such as a fabric.

According to the invention, incidentally, the planar shape of the frame body (i.e., the inner shape of the frame and the outer shape of the frame of the frame body portion, in the planar view) is not particularly restricted, and any desired shape (such as circular, elliptical, square, triangular or star-shaped) may be employed, depending on the size of the pet and the desired design property. The outer dimensions of the frame body (the lengths in each direction and the thickness) are also not particularly restricted, and any desired outer dimensions may be employed according to the size and type of pet that is to use it.

[Mat]

In the pet nursing product 10 of the second embodiment, as shown in FIG. 4 and FIG. 5, the mat 5 forming part of the pet bed 6 is constructed of an essentially rectangular solid cushioning member having a planar shape and dimensions allowing it to be inserted in a freely detachable manner on the inside of the frame of the frame body 4, and having a smaller thickness than the thickness of the frame body 4. The mat 5 is disposed at a location on the bottom side corresponding to the recess 6R, which is the sleeping area of the pet nursing product 10, and together with the cushion material 3, it allows the pet's body to be supported while diffusing the body pressure of the pet that is lying in the recess 6R.

Incidentally, when the frame body does not have a constant thickness as with the second embodiment, the thickness of the frame body is the thickness of the portion having the smallest thickness (the thickness of the frame body low part 41L, in the case of the second embodiment). For measurement of thickness other than that of the nonwoven fabric, the object to be measured (the mat, frame body or cushion material) is placed on a horizontal plane and the height (the distance from the horizontal plane to the top surface of the object to be measured) is measured at 4 arbitrary locations, recording the average value.

The cushioning member forming the mat 5 is not particularly restricted so long as it has physical properties (for example, a cushioning property, softness, strength and air permeability) allowing the cushioning member to function as the sleeping area of the pet bed, and for example, cotton or urethane foam, foam beads or a web-like fiber structure made of a thermoplastic resin may be used. Among these, from the viewpoint of having an excellent cushioning property with high resilience, and excellent performance in terms of air permeability, water permeability and durability, the cushioning member preferably employs a web-like fiber structure made of thermoplastic resin continuous fibers, similar to the fiber structure forming the liquid-permeable cushion material 3 described above.

For the fiber structure it is also suitable to use a fiber structure with a two-layer structure having, in the thickness direction, a low-density layer that has a relatively low density (apparent density) and a high-density layer that has a relatively high density. Such a fiber structure with a two-layer structure can exhibit cushioning performance with high resilience when used as a mat with the low-density layer as the top side.

The density (apparent density) of the fiber structure can be measured in the same manner as for the fiber structure forming the cushion material 3 described above.

The cushioning member forming the mat may be covered by a covering material such as a fabric (woven fabric or knitted fabric) made of synthetic fibers or natural fibers; however, the covering material preferably has a stretchable property from the viewpoint of ability to follow shape deformation of the cushioning member.

According to the invention, the shape and outer dimensions of the mat are not particularly restricted and any shape and outer dimension may be employed, so long as it has a shape and outer dimensions allowing it to be inserted in a freely detachable manner inside the frame of the frame body, and has a smaller thickness than the thickness of the frame body.

In the pet bed of the invention, the absorbent sheet situated on the top surface of the mat of the pet bed preferably has outer dimensions such that the planar area in the expanded state is larger than the planar area of the top surface of the mat. If the absorbent sheet has such outer dimensions, then when the absorbent sheet is situated on the top surface of the mat of the pet bed, the outer perimeter of the absorbent sheet will rise toward the top side along the inner peripheral wall surfaces of the frame body 4, as shown in FIG. 3 and FIG. 4, so as to form standing sections 2R that function as anti-leakage walls against liquid excreta. If such standing sections 2R are formed, the liquid excreta will be unlikely to leak from the absorbent sheet 2 (i.e., transmitted leakage will be unlikely to occur) even when they have diffused through the surface of the pet's body or the surface of the absorbent sheet 2 to the outer side in the in-plane direction of the absorbent sheet, thereby allowing a satisfactory hygienic condition to be more reliably obtained.

Furthermore, according to the invention, preferably the fiber structure forming the liquid-permeable cushion material has ends of the fibers composing the fiber structure (the constituent fibers) present on the side surfaces extending in the thickness direction of the fiber structure, and the ends are engaged with the absorbent sheet.

Figure 6:
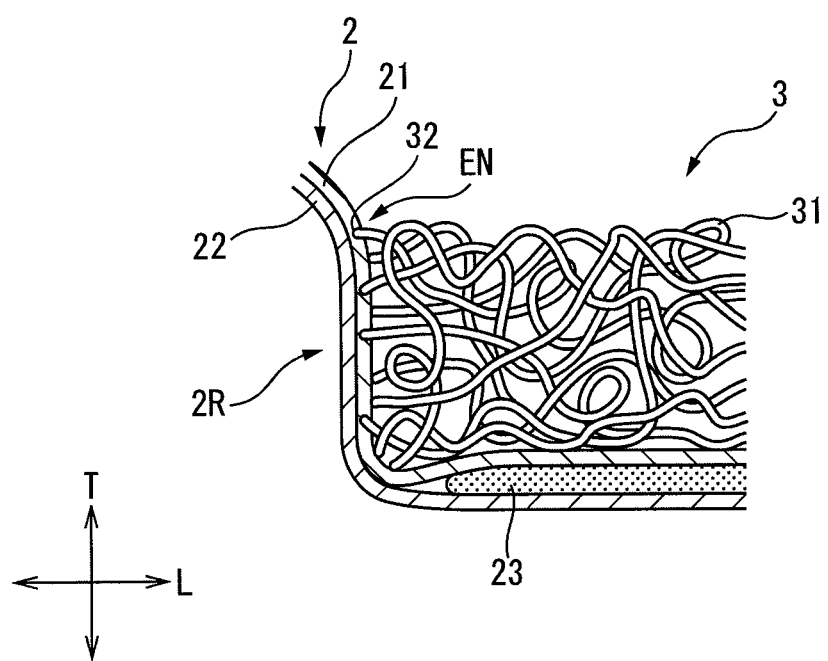
FIG. 6 is a partial magnified view of section VI of the pet nursing product according to the second embodiment of the invention in FIG. 4.

FIG. 6 is a partial magnified view of section VI of the pet nursing product 10 according to the second embodiment of the invention in FIG. 4. As shown in FIG. 6, when ends 32 of the constituent fibers 31 extending on a side surface of the fiber structure forming the cushion material 3 are engaged with the absorbent sheet 2 (specifically, the top sheet 21 of the absorbent sheet 2), the standing section 2R of the absorbent sheet 2 is held by the ends 32 of the constituent fibers 31 of the fiber structure at the engagement section EN, so that the standing state of the standing section 2R is even more easily maintained. This allows the effect exhibited by the standing section 2R of the absorbent sheet 2 to be even more reliably obtained.

Incidentally, the fiber structure forming the liquid-permeable cushion material preferably does not have ends of the constituent fibers present on the surfaces other than the side surfaces (i.e., on the top surface and bottom surface). If the fiber structure has such a structure, it will be possible to obtain high-resilience cushioning performance with even more excellent diffusion of body pressure.

[Method of Use]

A method of using a liquid-permeable cushion material with a thickness of 5 mm or greater in the pet nursing product described above will now be described, as another aspect of the invention.

As mentioned above, a liquid-permeable cushion material having a thickness of 5 mm or greater is made of a fiber structure that is formed of thermoplastic resin fibers having fiber diameters of 0.01 mm to 3 mm, does not include the ends of the continuous fibers on the top surface of the fiber structure, and has the continuous fibers joined together at the intersections between the continuous fibers, and such a cushion material can be used by being disposed on the top surface of an absorbent sheet having a liquid-retaining property, and then placing (laying) a pet in need of nursing on the top surface of the cushion material.

In this method of using the cushion material, a liquid-permeable cushion material is disposed on the top surface of an absorbent sheet having a liquid-retaining property, and therefore even when a bedridden pet has discharged liquid excreta such as urine on the cushion material, the liquid excreta permeate through the cushion material and can be absorbed and retained in the absorbent sheet below it. Furthermore, since the cushion material is made of a fiber structure having a specific structure, even when the pet has lain down on the top surface of the cushion material and applied body pressure in the thickness direction of the cushion material, the body pressure is diffused in the in-plane direction of the cushion material, helping to minimize reduction in the thickness of the cushion material. This allows a fixed space to be ensured between the pet's body and absorbent sheet, thereby helping to prevent the liquid excreta held in the absorbent sheet from contacting with the pet's body or the surface of the pet's body from becoming musty.

Furthermore, since the fiber structure forming the cushion material does not include the ends of the continuous fibers on the top surface of the fiber structure, it is possible to prevent the ends from causing physical irritation on the surface (i.e. the skin) of the pet's body.

Thus, with this method of using the cushion material, the surface of the body of a bedridden pet is less likely to be in a moist state by liquid excreta such as urine and less likely to be subjected to physical irritation, and therefore a satisfactory hygienic condition can be maintained and bedsores are unlikely to form. As a result, the effort required by the caregiver to deal with bedsores on pets (for example, periodical turning over) can be reduced.

Incidentally, the pet nursing product and method of using a liquid-permeable cushion material of the invention are not restricted to the aspects of the embodiments described above and can incorporate appropriate combinations and modifications within ranges that are not outside of the object and gist of the invention. For example, the pet nursing product may also comprise a washable cover that is freely detachable. Incidentally, the ordinal terms "first" and "second" as used throughout the present description serve merely to distinguish between the numbered embodiments and are not used to mean any relative ordering, precedence or importance.

EXAMPLES

The invention will now be explained in greater detail using examples and comparative examples, with the understanding that the invention is not limited only to these examples.

Example 1

A pet nursing product for Example 1 was fabricated, using a commercially available absorbing sheet for pets (trade name: "Deo Sheet Regular" by Unicharm Corp.) as the absorbent sheet, and placing a fiber structure made of a thermoplastic resin, having a density of 0.035 g/cm$^3$, a thickness of 40 mm and a thickness of 3 mm or greater when pressed by a pressure of 3.4 kPa, as a liquid-permeable cushion material on the top surface of the absorbent sheet.

Example 2

A pet nursing product for Example 2 was fabricated in the same manner as Example 1, except that a fiber structure having a density of 0.040 g/cm$^3$, a thickness of 35 mm and a thickness of 3 mm or greater when pressed by a pressure of 3.4 kPa, was used as the liquid-permeable cushion material.

Example 3

A pet nursing product for Example 3 was fabricated in the same manner as Example 1, except that a fiber structure having a density of 0.015 g/cm$^3$, a thickness of 50 mm and a thickness of 3 mm or greater when pressed by a pressure of 3.4 kPa, was used as the liquid-permeable cushion material.

Comparative Example 1

A pet nursing product for Comparative Example 1 was fabricated in the same manner as Example 1, except that a single air-through nonwoven fabric having a basis weight of 25 g/m$^2$ (density: 0.050 g/cm$^3$, thickness: 0.5 mm, thickness when pressed by a pressure of 3.4 kPa: <3 mm) was used as the liquid-permeable cushion material.

Comparative Example 2

A pet nursing product for Comparative Example 2 was fabricated in the same manner as Example 1, except that 16 air-through nonwoven fabrics each having a basis weight of 25 g/m$^2$ (density: 0.050 g/cm$^3$, thickness: 8 mm, thickness when pressed by a pressure of 3.4 kPa: ≥3 mm) were stacked for use as the liquid-permeable cushion material.

The pet nursing products fabricated in Examples 1 to 3 and Comparative Examples 1 and 2 were measured for absorption rate (sec), rewetting amount (g) and liquid holding amount (g) of the cushion material by the following respective measuring methods, and the absorption property, rewetting property and liquid-retaining property of the cushion material were evaluated for each pet nursing product. The construction and evaluation results for each pet nursing product are shown in Table 1.

[Method of Measuring Absorption Rate and Rewetting Amount]

(1) A cylinder (diameter: 60 mm, mass: 200 g) is set on the top surface of the cushion material of the pet nursing product.

(2) Artificial urine (80 ml) is dropped into the cylinder. The artificial urine is prepared by dissolving 200 g of urea, 80 g of sodium chloride, 8 g of magnesium sulfate, 3 g of calcium chloride and approximately 1 g of dye (Blue #1) in 10 L of ion-exchanged water.

(3) The time (sec) after dropping of the artificial urine until the artificial urine disappears from the cylinder is measured and recorded as the absorption rate (sec) of the pet nursing product.

(4) Ten seconds after dropping the artificial urine, a 50 g sheet of filter paper is placed on the top surface of the cushion material on which the artificial urine has been dropped, and a 3.5 Kg (10 cm×10 cm) deadweight is in turn placed on the filter paper.

(5) The mass (g) of the filter paper is measured 3 minutes after placing the deadweight, and the mass (g) of the artificial urine absorbed into the filter paper is calculated and recorded as the rewetting amount (g) of the pet nursing product.

[Method of Measuring Liquid Holding Amount of Cushion Material]

(1) The cushion material whose mass (g) has previously been measured is set on a beaker with a prescribed volume (for example, 500 ml), and then 60 ml of artificial urine is dropped onto the top surface of the cushion material.

(2) After dropping the artificial urine, the mass (g) of the cushion material is immediately measured, and the mass (g) of the artificial urine remaining inside the cushion material is calculated and recorded as the liquid holding amount (g) of the cushion material.

21 Top sheet
22 Back sheet
23 Absorbent body
3 Cushion material
31 Constituent fiber
32 End
4 Frame body
41 Frame body portion
41a Core material
41b Covering material
42 Frame body recess
42B Bottom part
5 Mat
6 Pet bed

The invention claimed is:

1. A pet nursing product comprising an absorbent sheet with a liquid-retaining property, and a liquid-permeable cushion material disposed on a top surface of the absorbent sheet, the cushion material having a thickness of 5 mm or greater, wherein
the cushion material is made of a fiber structure composed of thermoplastic resin continuous fibers having fiber diameters of 0.01 mm to 3 mm,
the fiber structure does not include ends of the continuous fibers on a top surface of the fiber structure, and
the continuous fibers are joined together at intersections between the continuous fibers, wherein
the absorbent sheet comprises a top sheet made of a nonwoven fabric, a back sheet, and an absorbent body situated between these two sheets, and
the nonwoven fabric has a lower density than the fiber structure, wherein the pet nursing product further includes a pet bed comprising a frame body with a prescribed thickness, and a mat that has a smaller thickness than the thickness of the frame body and is

TABLE 1

|  |  | Example 1 | Example 2 | Example 3 | Comp. Ex. 1 | Comp. Ex. 2 |
|---|---|---|---|---|---|---|
| Pet nursing product construction | Absorbent sheet | Absorbing sheet for pet | Absorbing sheet for pet | Absorbing sheet for pet | Absorbing sheet for pet | Absorbing sheet for pet |
|  | Cushion material | Fiber structure | Fiber structure | Fiber structure | Air-through nonwoven fabric (single sheet) | Air-through nonwoven fabric (stack of 16) |
|  | Density (g/cm$^3$) | 0.035 | 0.040 | 0.015 | 0.050 | 0.050 |
|  | Thickness (mm) | 40 | 35 | 50 | 0.5 | 8 |
|  | Thickness under 3.4 kPa pressure | ≥3 mm | ≥3 mm | ≥3 mm | <3 mm | ≥3 mm |
| Evaluation results | Absorption rate (sec) | 0 | 0 | 0 | 10 | 3.4 |
|  | Rewetting amount (g) | 0.1 | 0.1 | 0.1 | 50 | 60 |
|  | Liquid retention (g) | 1.4 | 1.3 | 0.3 | 2.9 | 46.0 |

As shown in Table 1, the pet nursing products of Examples 1 to 3 all had excellent properties in terms of absorption, rewetting and liquid retention of the cushion material, demonstrating that they can provide an environment in which the surface of the body of a bedridden pet is unlikely to become moist. On the other hand, the pet nursing products of Comparative Examples 1 and 2 all had inferior properties in terms of absorption, rewetting and liquid retention of the cushion material, demonstrating that they form an environment in which the surface of the body of a bedridden pet is likely to become moist.

REFERENCE SIGNS LIST

1 Pet nursing product
10 Pet nursing product
2 Absorbent sheet inserted in a freely detachable manner in the frame body, the absorbent sheet being disposed on a top surface of the mat wherein ends of the continuous fibers extending on a side surface of the cushion material hold a standing section of the absorbent sheet to maintain a standing state of the absorbent sheet.

2. The pet nursing product according to claim 1, wherein the fiber structure has a density of 0.01 g/cm$^3$ to 0.10 g/cm$^3$.

3. The pet nursing product according to claim 1, wherein the fiber diameters of the thermoplastic resin continuous fibers are larger than fiber diameters of fibers composing the nonwoven fabric.

4. The pet nursing product according to claim 1, wherein the fiber structure has, in a thickness direction, a high-density layer that forms the top surface of the fiber structure and has relatively high density, and a low-density layer that is located on a bottom surface side of the high-density layer and has relatively low density.

5. The pet nursing product according to claim 1, wherein the fiber structure has a water retention of no greater than 7%.

6. A method of using a liquid-permeable cushion material having a thickness of 5 mm or greater,
the cushion material being made of a fiber structure that is composed of thermoplastic resin continuous fibers having fiber diameters of 0.01 mm to 3 mm, does not include ends of the continuous fibers on a top surface of the fiber structure, and has the continuous fibers joined together at intersections between the continuous fibers,
wherein the method includes disposing the cushion material on a top surface of an absorbent sheet with a liquid-retaining property, and then placing a pet on a top surface of the cushion material and nursing a pet, wherein
the absorbent sheet comprises a top sheet made of a nonwoven fabric, a back sheet, and an absorbent body situated between these two sheets, and
the nonwoven fabric has a lower density than the fiber structure, wherein the pet nursing product further includes a pet bed comprising a frame body with a prescribed thickness, and a mat that has a smaller thickness than the thickness of the frame body and is inserted in a freely detachable manner in the frame body, the absorbent sheet being disposed on a top surface of the mat wherein ends of the continuous fibers extending on a side surface of the cushion material hold a standing section of the absorbent sheet to maintain a standing state of the absorbent sheet.

* * * * *